June 21, 1927.

K. AUERBACH 1,633,430

UPSETTING MACHINE

Filed Oct. 9, 1925

Inventor:
Karl Auerbach
by
Attorney

Patented June 21, 1927.

1,633,430

UNITED STATES PATENT OFFICE.

KARL AUERBACH, OF SAALFELD-SAALE, GERMANY, ASSIGNOR TO HERMAN F. HOEVEL, OF NEW YORK, N. Y.

UPSETTING MACHINE.

Application filed October 9, 1925, Serial No. 61,423, and in Germany May 7, 1924.

This invention relates to an upsetting machine with upsetting carriages having means for clamping tightly the work or the die for the work. The clamping of the work in the known upsetting carriages does not give, in the case of relatively thick blanks or of great upsetting resistance, sufficient security against displacement of the work so that it might happen that, especially with a succession of identical operations, the upset portions are not accurately of the prescribed shape and size. The invention has for its object to obviate this inconvenience, to ensure a greater accuracy as regards the amount of upsetting done and the shape of the upset portions, and further to render possible the mechanical upsetting of thick blanks. With these objects in view the upsetting carriages are fitted, according to the invention, with an abutment for the work, said abutment being designed to take or sustain the axial shearing stress, and adjustable on a guide, on which it may be secured in position after such adjustment.

For upsetting at the end of the work only one carriage need have this arrangement while both upsetting carriages must have this arrangement when upsettings are to be produced between the ends of the work.

An embodiment of the invention is shown, by way of example, in the accompanying drawing in which:—

Figure 1:
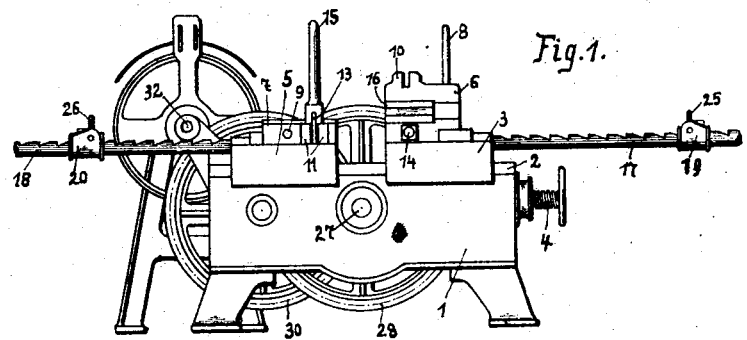
Figure 2:
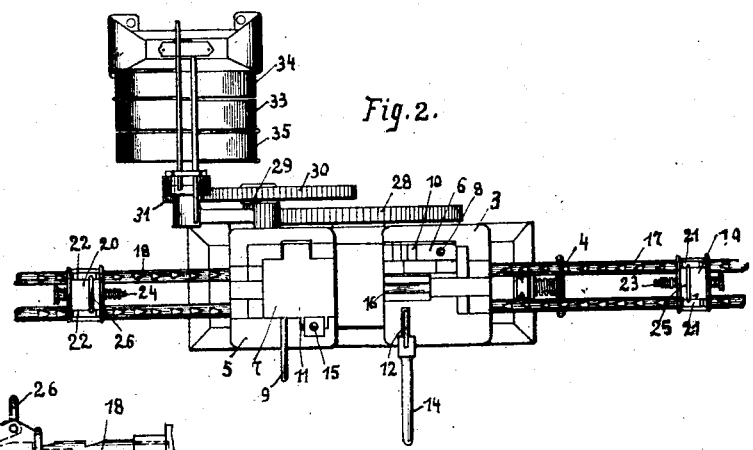

Fig. 1 is a front elevation,

Fig. 2 a plan view, and

Figure 3:
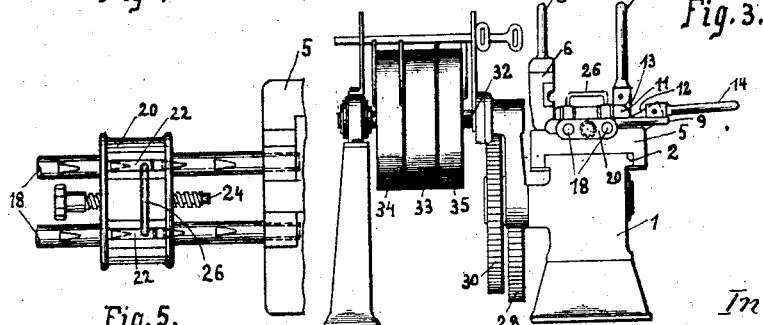

Fig. 3 an end elevation of a machine the two upsetting carriages of which have an arrangement according to the invention.

Figure 4:
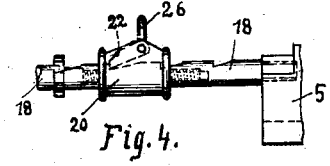
Figure 5:
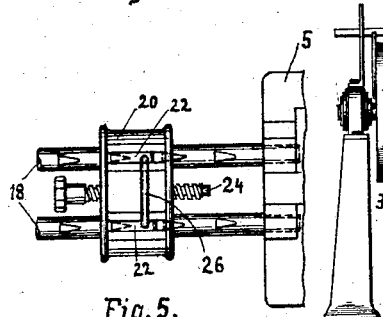

Figs. 4 and 5 show the abutment on an enlarged scale in elevation and plan view respectively.

Upon a frame 1 a carriage 3 is mounted on a guide 2 so that the carriage can be shifted with the aid of an adjusting spindle 4. On the machine frame 1 an upsetting or pull carriage 5 is further arranged corresponding with carriage 3. The upsetting carriage 5 is connected by a rod with an upsetting eccentric (not shown) mounted on a shaft 27. The shaft 27 is journalled in the machine frame 1 and driven, through the intermediary of a transmission gear 28, 29, 30, 31, from a shaft 32 on which a belt pulley 33 is keyed and two loose pulleys 34, 35 are mounted. The carriage 3 constitutes a normally stationary blank-holder movable for longitudinal adjustment toward and from the path of the reciprocation of the upsetting carriage 5, this arrangement enabling me to vary the minimum distance which will exist between the blank-holder and the upsetting carriage during the reciprocation of said carriage.

The carriages 3 and 5 have each a hinged cover 6, 7 respectively having each a handle 8, 9 and a forked cam 10, 11 respectively.

The front edges of the forked cams 10, 11 are curved. On each carriage 3, 5 an arm 12, 13 respectively is hingedly fixed which engages with the gap in the forked cam and has hingedly mounted on its outer end a clamping lever 14, 15 respectively. The forked heads of the clamping levers 14, 15 have curved edges designed to cooperate with the curved edges of the fork-shaped cams 10, 11 said curved edges of the forked heads being however eccentrical with regard to the hinge pin so that when, for closing the hinged cover, the lever 14 or 15 is rolled upon the cam 10 or 11 the pressure exerted upon the cover is increased, said pressure being reduced when the clamping levers 14, 15 are rolled in opposite direction upon the forked cams 10, 11 prior to the cover being opened. The carriages 3, 5 and their covers 6, 7 have a longitudinal bore designed to receive the work and further cavities at the ends which face one another, said cavities serving to accommodate the upsetting dies 16. Each carriage 3, 5 has further two racks 17, 18 forming extensions which project rearwardly from the carriages, an abutment carrier 19, 20 respectively being adjustably mounted on each pair of racks (Figs. 4 and 5). In each abutment carrier 19, 20 two locking pawls 21, 22 respectively are arranged which engage with the teeth of the rack 17, 18 and lock the abutment carriers 19, 20 against displacement in outward direction. The two locking pawls of each abutment are connected with one another by a handle 25, 26 respectively. An adjusting spindle 23, 24 respectively arranged in each abutment carrier 19, 20 serves as an abutment adjustable in accordance with the length of the work.

For carrying out the upsetting the covers 6, 7 of the carriages 3 and 5 are opened and after the dies and the blank have been inserted the dies are closed again, the carriage 3 having previously been adjusted on the guide 2 with the aid of spindle 4 in accordance with the length of the upsetting to be executed. The hinged covers 6, 7 are securely locked by means of the levers 12—14 and 13—15 respectively, so that the work or blank with the dies is securely clamped. The abutment carriers 19, 20 are then adjusted on the racks 17, 18 in accordance with the length of the work and locked in position and the spindles or abutments 23, 24 are adjusted so that they touch the ends of the work.

The belt is thrown in for forward drive and shifted when the upsetting has been completed whereupon the clamping mechanism is released and the upsetting carriage moved back into the initial position by throwing the belt in for reverse drive. When the work has jammed it can be released by throwing in the reverse.

I claim:—

1. An upsetting-machine comprising in combination with the machine frame, a guide on said frame, a carriage for the work and an upsetting carriage movably mounted on said guide the one opposite the other, a spindle drive for the work carriage, a pair of racks on each carriage projecting from the rear ends of the same, and abutments for the work said abutments being adjustably mounted one on each pair of racks and designed to sustain the axial shearing stress produced by the upsetting resistance.

2. An upsetting-machine comprising in combination with the machine frame, a guide on said frame, a carriage for the work and an upsetting carriage movably mounted on said guide the one opposite the other, a drive for the work carriage, a pair of racks on each carriage projecting from the rear ends of the same, abutments for the work said abutments being adjustably mounted on each pair of racks and designed to sustain the axial shearing stress produced by the upsetting resistance, and locking pawls for each abutment engaging with the teeth of the corresponding racks to lock the abutments against movement in rearward direction.

3. An upsetting machine comprising in combination with the machine frame, a guide on said frame, a carriage for the work and an upsetting carriage movably mounted on said guide the one opposite the other, a drive for the work carriage, a pair of racks on each carriage projecting from the rear ends of the same, abutment carriers for the work said abutment carriers being adjustably mounted one on each pair of racks and designed to sustain the axial shearing stress produced by the upsetting resistance, locking pawls on each carrier engaging with the teeth of the corresponding racks to lock the abutment carriers against movement in rearward direction, and a screw spindle on each carrier designed as an abutment to be brought in contact with the corresponding end of the work.

4. An upsetting machine comprising a support for one end of the work, an upsetting carriage slidably mounted adjacent said support, power means for moving said carriage toward said support, and means for holding the other end of the work against longitudinal movement with respect to said carriage, comprising a pair of racks extending rearwardly from said carriage, an abutment carrier mounted on said racks, pawls carried by said abutment carrier and adapted to releasably engage said racks, and an abutment on said carrier and adjustable relative thereto.

5. An upsetting machine comprising a support for one end of the work, an upsetting carriage reciprocable toward and away from said support, a hinged cover on said carriage, a die member carried by said cover and by said carriage, means for reciprocating said carriage, and means for holding the work against longitudinal movement with respect to said carriage, comprising an extension rack extending rearwardly from said carriage, an abutment carrier on said extension rack, pawls carried by said carrier and adapted to releasably engage said extension rack, and an abutment on said carrier and adjustable relative thereto.

In testimony whereof I affix my signature.

KARL AUERBACH.